United States Patent [19]

Oba

[11] Patent Number: 4,887,226

[45] Date of Patent: Dec. 12, 1989

[54] DOT PRINTING DEVICE CAPABLE OF PRINTING UNDERLINE TOGETHER WITH CHARACTERS

[76] Inventor: Ryozo Oba, 130 Fukara, Susono-shi, Shizuoka-ken, Japan

[21] Appl. No.: 687,597

[22] Filed: Dec. 31, 1984

[30] Foreign Application Priority Data

Jan. 17, 1984 [JP] Japan ................... 59-6065

[51] Int. Cl.⁴ .................. B41J 3/02; G06F 15/40; G09G 1/06
[52] U.S. Cl. .................... 364/519; 340/731; 364/523; 400/22; 400/121
[58] Field of Search ............ 364/519, 523; 400/22, 400/121, 17; 340/731, 723

[56] References Cited

U.S. PATENT DOCUMENTS

| | | | |
|---|---|---|---|
| 3,895,374 | 4/1975 | Williams | 340/798 |
| 3,895,375 | 4/1975 | Williams | 340/798 |
| 3,896,428 | 4/1975 | Williams | 340/731 |
| 3,911,420 | 10/1975 | Lampson | 340/731 |
| 3,991,868 | 11/1976 | Robinson et al. | 178/30 |
| 4,107,786 | 8/1978 | Masaki et al. | 340/731 |
| 4,129,860 | 12/1978 | Yonezawa et al. | 340/731 |
| 4,254,409 | 3/1981 | Busby | 340/723 |
| 4,342,096 | 4/1982 | McDevitt | 364/523 |
| 4,372,696 | 2/1983 | Pou | 400/124 |
| 4,400,791 | 8/1983 | Kitado | 400/124 |
| 4,408,907 | 10/1983 | Bernardis | 400/124 |
| 4,429,306 | 1/1984 | Macauley et al. | 340/735 |
| 4,431,319 | 2/1984 | Karaki | 400/121 |
| 4,521,123 | 6/1985 | Boehmer | 400/121 |
| 4,524,367 | 6/1985 | Horiya et al. | 358/77 |
| 4,555,191 | 11/1985 | Gojo | 400/121 |
| 4,566,813 | 1/1986 | Kobayashi et al. | 400/22 |
| 4,598,283 | 7/1986 | Tung et al. | 382/47 X |
| 4,602,880 | 7/1986 | Oba | 400/121 |
| 4,610,026 | 9/1986 | Tabata et al. | 382/47 |

FOREIGN PATENT DOCUMENTS

| | | | |
|---|---|---|---|
| 0121882 | 10/1984 | European Pat. Off. | |
| 2416921 | 10/1974 | Fed. Rep. of Germany | 400/17 |
| 57-176176 | 10/1982 | Japan | 400/124 |
| 0119865 | 7/1983 | Japan | 400/22 |
| 0202865 | 11/1984 | Japan | 400/22 |
| 0169846 | 4/1982 | Netherlands | 400/17 |

OTHER PUBLICATIONS

Zucker, "Prowrite", 80—*U.S. Journal*, Jul. 1982, vol. 5, No. 7, pp. 78-87.

Feigel et al., "Byte Printer Directory", *BYTE*, Mar. 1982, pp. 278-296.

Lee, Monty, "Graftrax Plus", *Peelings II*, Nov. 1982, vol. 3, No. 8, pp. 46-47.

*Primary Examiner*—Parshotam S. Lall
*Assistant Examiner*—Joseph L. Dixon
*Attorney, Agent, or Firm*—Frishauf, Holtz, Goodman & Woodward

[57] ABSTRACT

A dot printing device includes a head having a plurality of dot printing elements, a head driver for selectively energizing the dot printing elements according to dot data, a character generator, and data processing unit which causes designated character data to be generated from said character generator according to first input data including character designation data and underline data and transfers the designated character data together with one-bit dot data representing an underline to the head driver. The data processing unit operates according to second input data including character designation data, underline data and double height data to print an upper half portion of the designated character data in a first printing cycle and transfers dot data representing a lower half of the designated character data and two-bit dot data representing an underline to the head driver in a second printing cycle.

8 Claims, 11 Drawing Sheets

| PRE1 | PRE2 | PRE3 | PRE4 | DATA | PRE1 | PRE2 | PRE3 | PRE4 | DATA | EM | EM | EM | EM | EM |
|------|------|------|------|------|------|------|------|------|------|----|----|----|----|----|

↳ TOP ADDRESS POSITION                                                 AND ADDRESS POSITION ↲

FIG. 8

PRE1:  0 0 0 0 0 1 0 0
PRE2:  0 0 0 0 0 0 0 0
PRE3:  0 0 0 0 0 0 0 0
PRE4:  0 0 0 0 0 0 1 0
DATA: [j] ... [t]
EM: 0 0 0 0 0 0 0 0   0 0 0 0 0 0 0 0

FIG. 9

PRE1:  0 0 0 1 0 1 0 0
PRE2:  0 0 0 0 0'0 0 0
PRE3:  0 0 0 0 0 1 0 0
PRE4:  0 0 0 0 0 0 1 0
DATA: [j] ... [t]
EM: 0 0 0 0 0 0 0   0 0 0 0 0 0

DOT PRINTING DEVICE CAPABLE OF PRINTING UNDERLINE TOGETHER WITH CHARACTERS

BACKGROUND OF THE INVENTION

This invention relates to a dot printing device with a function of printing double height characters.

The dot printing device usually has a printing head having N head pins arranged in a row. During printing, the printing head is moved at a constant speed in a direction perpendicular to the head pin row, while the individual head pins are selectively driven according to dot data for a character to be printed which is provided from a character generator. It has been well known in the art to print some of the characters to be printed as double width characters by doubling the width of each character or as double height characters by doubling the height of each character.

Meanwhile, it is sometimes required to print an underline not only with ordinary size characters but also with double height characters. In the prior art, an underline printing signal is provided separately from character data. That is, the underline is printed in fixed form irrespective of the type of characters which are printed together with it. Where a single head pin is used for printing an underline, for instance, the underline is printed in a well-balanced state in case it is printed with ordinary size characters, but when the underline is printed with double height characters, it looks rather thin compared to the double height characters so that the balance of the print as a whole is lost.

SUMMARY OF THE INVENTION

An object of the invention is to provide a dot printing device which can print double height characters and an underline simultaneously in a well-balanced state, according to ordinary character data.

To attain the above object of the invention, there is provided a dot printing device, which comprises a head having N dot printing elements arranged in a row, a head driver for selectively energizing these dot printing elements according to dot data, a head moving unit for causing movement of the head relative to paper, a paper feeder for feeding paper, a character generator, and a data processing unit for reading, according to first input data including character designation data and underline data, character data designated by the character designation data in the first input data from said character generator for printing the character data while also printing an underline with one or a first predetermined number of head pins among the N dot printing elements, and also for reading out, according to second input data including character designation data, underline data and double height data, character data designated by the character designation data in second input data and constituted by a plurality of N-bit dot data from the character generator, executing printing of an upper half of the character data according to N-bit dot data equal to the N-bit dot data in 2N-bit dot data obtained by doubling each bit of each N-bit dot data which corresponds to an upper half portion of the character data to the head driver for printing the upper half portion of the character data, then reading out character data designated by the character designation data in the second input data and constituted by a plurality of N-bit dot data from the character generator and printing a lower half portion of the character data in a position matched to the previously printed upper half portion of the character data according to N-bit dot data equal to the N-bit dot data in 2N-bit dot data obtained by doubling each bit of each N-bit dot data which corresponds to the lower half of the character data while also printing an underline with a second predetermined number of lower dot printing elements greater in number than the first predetermined number in the N dot printing elements.

According to the invention, it is possible to print underlines of thicknesses that are in conformity to ordinary size characters and double height characters, that is, it is possible to print ordinary characters and double height characters with the underline in a well-balanced state.

DETAILED DESCRIPTION OF THE PREFERRED EMBODIMENT

Figure 1:
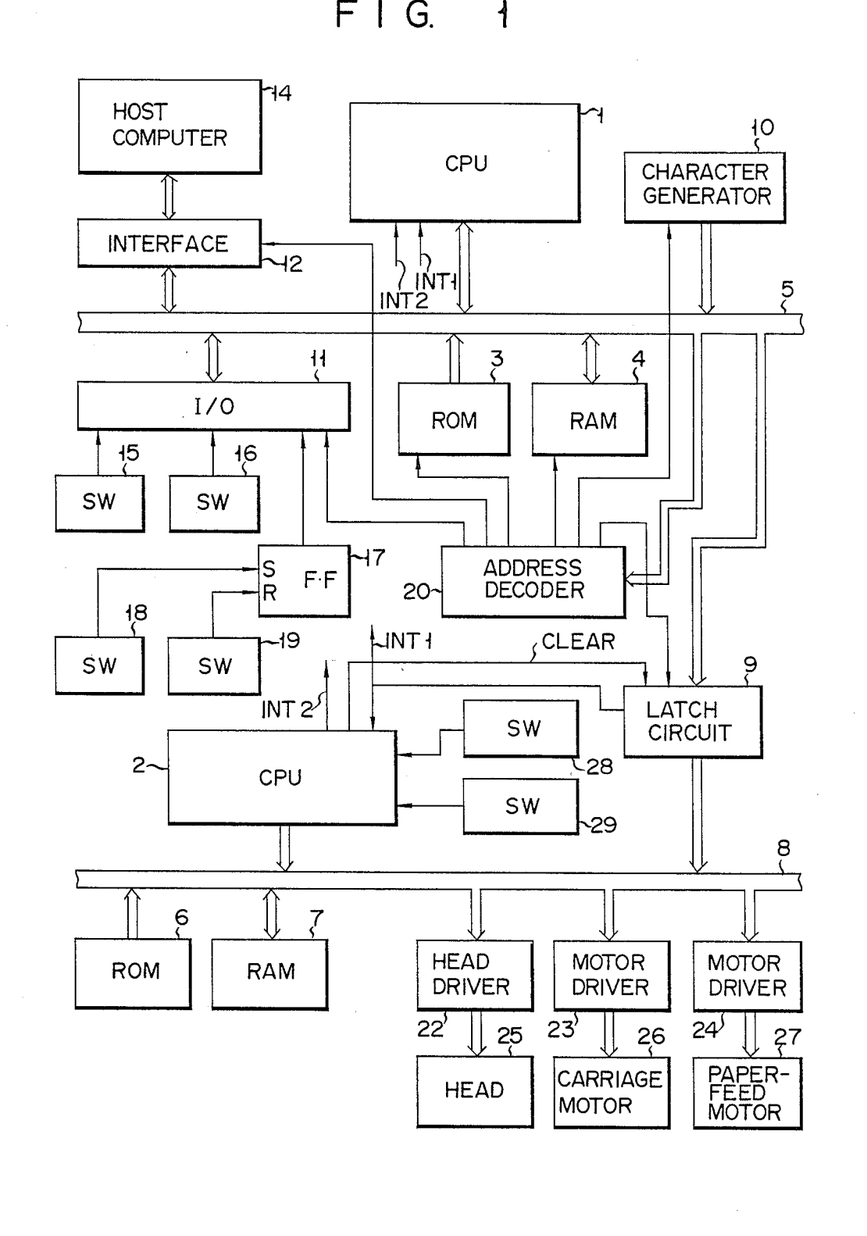
FIG. 1 is a block diagram showing an embodiment of the dot printing device according to the invention.

FIG. 1 is a block diagram showing an embodiment of the dot printing device according to the invention. The illustrated circuit includes a master CPU 1 and a slave CPU 2. A read only memory (ROM) 3 and a random access memory (RAM) 4 are connected to the CPU 1 via an address and data bus 5. A ROM 6 and a RAM 7 are connected to the CPU 2 via a data bus 8. A data latch circuit 9 is provided for the address and data bus 5 and data bus 8. A character generator 10, an address decoder 20, an I/O port 11 and an interface 12 are provided for the CPU 1. A host computer 14 is connected to the CPU 1 via the interface 12. A line feed switch 15, a form feed switch 16 and a flip-flop 17 are connected to the CPU 1 via the I/O port 11. An on-line switch 18 and an off-line switch 19 are connected to respective set and reset terminals of the flip-flop 17. An address decoder 20 is connected to the address and data bus 5, and either the ROM 3, RAM 4, latch circuit 9, character generator 10, I/O port 11 or interface 12 is selectively energized according to an address from the CPU 1.

A head driver 22 and motor drivers 23 and 24 are connected to the CPU 2 via the data bus 8. The head driver 22 and motor drivers 23 and 24 are used to drive a printing head 25 having nine pins, for instance, a carriage motor 26 and an upper feed motor 27, respectively. A home position switch 28 and a right position switch 29 are connected to the CPU 2.

Figure 2:
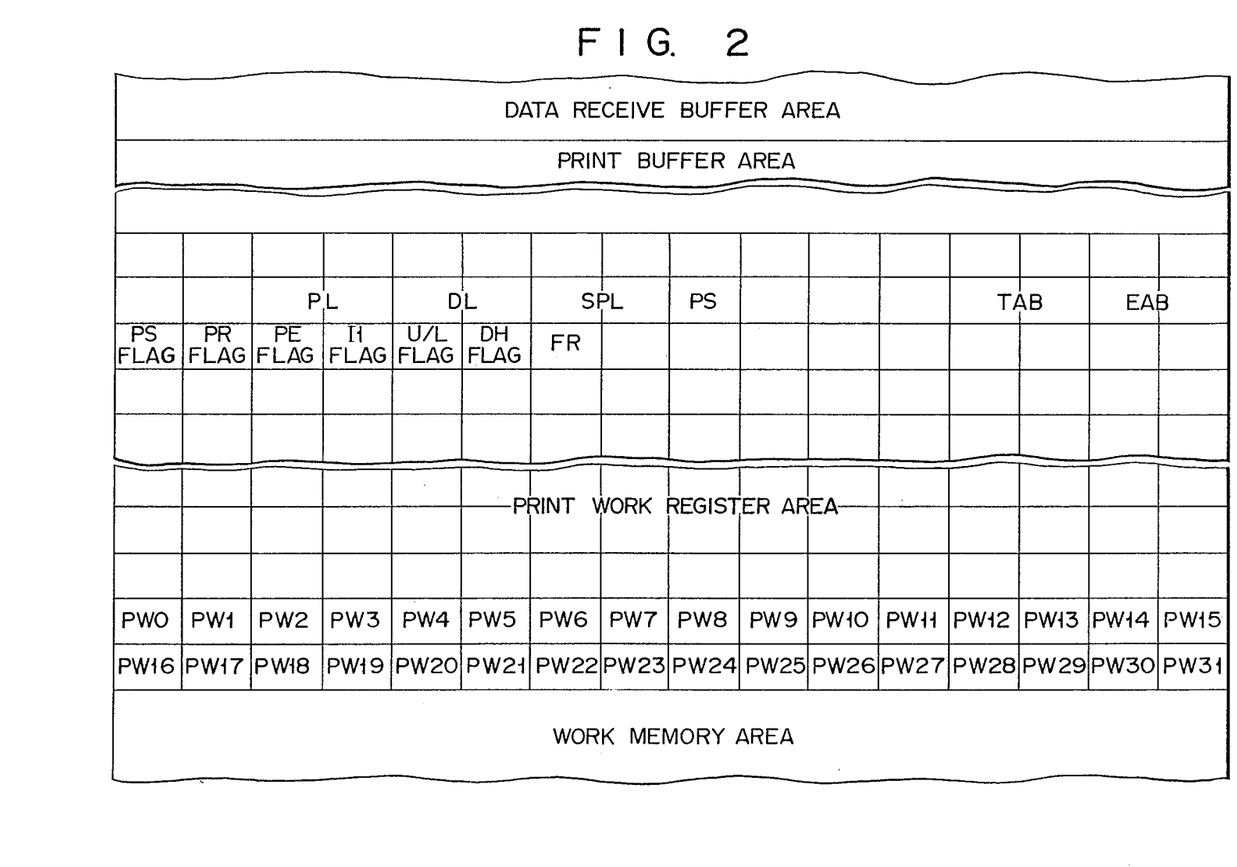
FIG. 2 is a view showing the memory map of a RAM used in the dot printing device shown in FIG. 1.

The RAM 4, as shown in FIG. 2, has a data receive buffer area, a print buffer area, a print work register area and a work memory area.

The CPU 1 transfers character data to the latch circuit 9 according to a command from the host computer 14. When the character data is latched in it, the latch circuit 9 transfers an interrupt signal INT1 to the CPUs 1 and 2. In response to the leading edge of the interrupt signal INT1, the CPU 2 reads out character data from the latch circuit 9 and then generates a clear signal to clear the latch circuit 9.

The data transferred from the CPU 1 to the CPU 2 via the latch circuit 9 includes motor drive data about a slow-up constant, a slow-down constant and a speed pattern which are necessary for driving the stepping motors 26 and 27, distance data representing the distance from the home position switch 28 to a column "0" position and time data representing the time of energization of the head 25 as well as printing information, printing data and feed data. The constant data are transferred from the CPU 1 to the CPU 2 in an initialization step after the closure of the power source.

Figure 3:
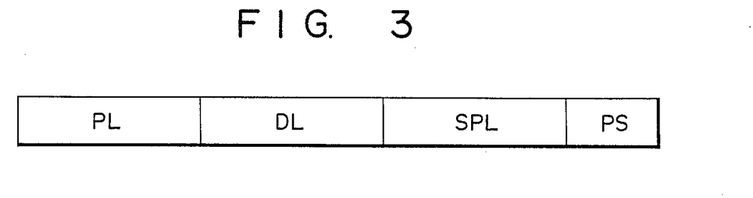
FIG. 3 is a view showing a data format of printing data.
Figure 4:
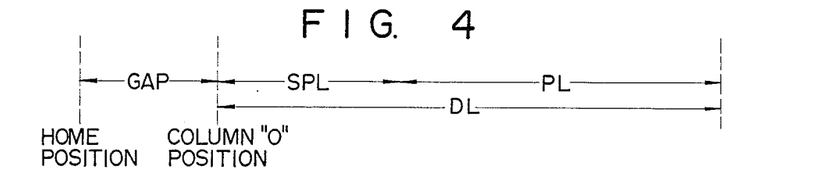
FIG. 4 is a view showing a relationship among space length data, print length data and data length data.

The printing information, as shown in FIG. 3, includes print length data PL, data length data DL, space length data SPL and printing speed data PS. The printing speed data PS is a one-byte data representing the speed of printing and direction of printing. It represents speeds of 10, 12 and 16.7 cpi when its lower two-bit data is "01", "10" and "11" respectively. Also it represents a rightward printing direction and a leftward printing direction when its fourth bit position is "0" and "1" respectively. As shown in FIG. 4, the space length data SPL represents the distance from the column "0" position to a start position, from which the printing data is printed. The print data PL represents the length of printing of the printing data, and the data length data DL represents the distance of movement of the carriage, which is equal to the sum of the distances SPL and PL. Actually, the distance of movement of the carriage includes a distance necessary for slow-up and slow-down operations. The data SPL and DL are two-byte data and are transferred together with one-byte data PS to the CPU 2 for controlling the carriage motor 26.

The printing data includes preinformation data of one-byte and dot data of one byte. The preinformation data is stored in the print work register PW14 in the print work register area in the RAM 4, and the dot data is stored in the print work register PW15. The print work registers PW14 and PW15 are 8-bit registers. The CPU 2 controls upper eight pins P1 to P8 among nine pins of the head 25, and it also controls the lowermost pin P9 of the head 25 according to the bit in a "3" bit position of the print work register PW14.

The feed data includes data representing the direction and distance of feed of paper. The feed distance is set to, for instance, a feed pulse number/144 inch. This feed data is stored in the feed register FR of the RAM 4. Feed pulse number data is stored in the "0" to "5" bit positions of the feed register FR, and data concerning the feed direction is stored in the "6" bit position.

A case will now be considered where paper is fed forwardly by 1/6 inch with an operation of the line feed switch 15. In this case, the CPU 1 detects the operation of the line feed switch 15, and writes pulse number data "24" representing 1/6 inch in the latch circuit 9. The CPU 2 reads out the feed pulse number data "24" from the latch circuit 9 and transfers 24 feed pulses to the paper feed motor 27 for forwardly feeding paper by 24/144 = 1/6 inch.

Figure 5A:
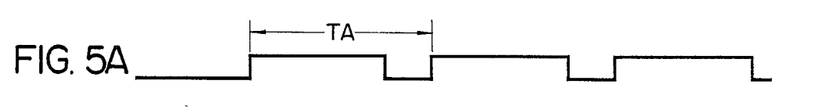
FIGS. 5A to 5E are signal waveform diagrams for explaining the timing of transfer of data from a master CPU to a slave CPU used in the dot printing device shown in FIG. 1.
Figure 5B:
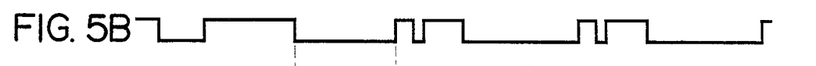
Figure 5C:
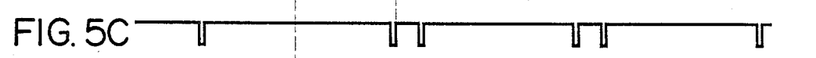
Figure 5D:
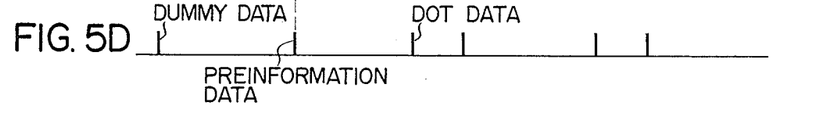
Figure 5E:
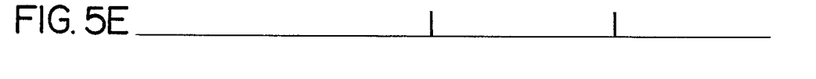

FIGS. 5A to 5E illustrate the timing of transfer of print data to the CPU 2. In this example, it is assumed that SPL=0 and DL=PL. Before the transfer of the print data, the CPU 1 transfers dummy data DD to the latch circuit 9 as shown in FIG. 5D. When the dummy data DD is stored, the latch circuit 9 generates an interrupt signal INT1, as shown in FIG. 5B. After the data stored in the latch circuit 9 is read out, the CPU 2 generates a clear signal shown in FIG. 5C in response to the rising of the interrupt signal INT1 from the latch circuit 9, thus clearing the content of the latch circuit 9. The CPU 2 generates an interrupt signal INT2 shown in FIG. 5A after the lapse of a predetermined period of time from the generation of the dummy data DD. Subsequently, in response to the falling of the interrupt signal INT1, the CPU 1 reads out dot data from the character generator 10 according to the data stored in the print buffer area and stores the read-out data in the print work registers PW14 and PW15. Then it reads out preinformation data from the print work register PW14 and transfers it to the latch circuit 9. The CPU 1 reads the preinformation data into the RAM 7 in the manner as described. Then, it clears the content of the latch circuit 9 and sets the interrupt signal INT1 to a high level. After this, when the interrupt signal INT1 falls within a period TA of the interrupt signal INT2, the CPU 1 reads out the dot data from the print work register PW15 and transfers it to the latch circuit 9. The CPU 2 reads out the dot data form the latch circuit 9 into the RAM 7. Subsequently, the CPU 2 generates the next interrupt signal INT2, and transfers the preinformation data and dot data stored in the RAM 7 to the head driver 22 at the timing shown in FIG. 5E, whereby the pins P1 to P9 are selectively energized according to the preinformation data and dot data.

Figure 6:
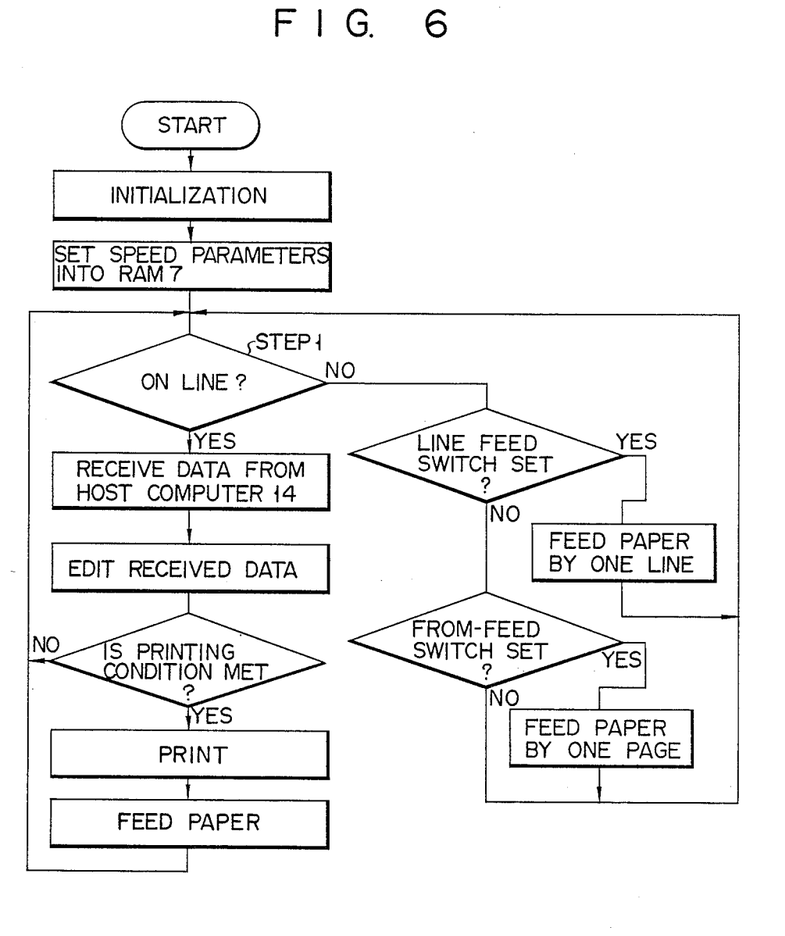
FIG. 6 is a flow chart showing the basic routine of the master CPU and slave CPU used in the dot printing device shown in FIG. 1.

FIG. 6 is a flow chart illustrating the basic program routine of the CPUs 1 and 2. After the start, i.e., turn-ON of the power source, the device is initialized, e.g., the RAMs 4 and 7 are cleared. Then, the CPU 2 sets speed data slow-up and slow-down constant speed parameters for the carriage motor 26 into the RAM 7. Then, STEP 1 is executed, in which a check is made to see whether it is the ON-line switch 18 or the OFF-line switch 19 that is set. If it is detected that the ON-line switch 18 is set, the CPU 1 receives data from the host computer 14. Then it edits the received data according to a data edit routine. Then it is checked whether a printing condition is met. If it is met, printing on printing paper is executed according to a printing routine. Then the paper is fed according to a paper feed routine.

If it is detected in STEP 1 that the OFF-line switch 19 is set, the CPU 1 checks whether the line feed switch 15 or the form feed switch 16 is set. If it is detected that the switch 15 or 16 is set, the paper is fed for one line or for one page.

Figure 7:
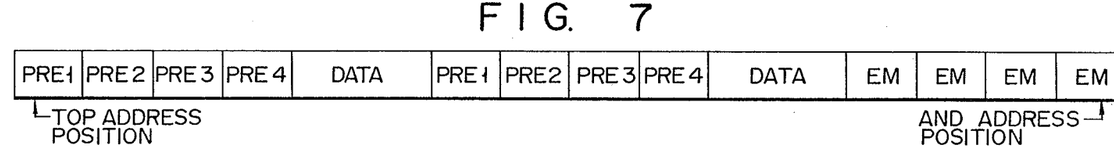
FIG. 7 is a view showing a format of data edited in an edit routine shown in FIG. 7.

FIG. 7 shows a format of data-edited in the edit routine shown in FIG. 6. The edited data is stored in a print buffer area of the RAM 4 that is defined by the top and end addresses stored in top and end address buffer registers TAB and EAB in the print work register area in the RAM 4. As is shown in FIG. 7, the edited data is the data for one line including a plurality of data groups, each of which includes four preinformation data PRE1 to PRE4 and character data, and four end mark data EM representing the end of data. The preinformation data PRE1 to PRE4 are one-byte data. The preinformation data PRE1 includes, for instance, in "0", "1", "2" and "4" bit positions, bit data respectively representing bold printing, elongation printing, underline printing and double printing (i.e., printing of the same data twice along the same print line). The preinformation data PRE2 represents the kind of character, i.e., US ASCII, British, German, French, etc., by three-bit data at the "0" to "2" bit positions and also designates the character format, i.e., standard ASCII, near letter quality (NLQ) [proportional], NLQ [monospaced], block by two-bit data at the "4" and "5" bit positions. The preinformation data PRE3 designates the character form, i.e., subscript, superscript, double height, italic, etc., at the "0", "1", "2", and "3" bit positions. The preinformation data PRE4 represents the number of the following character data.

When printing the two standard ASCII characters "j" and "t" with underline, data "00000100", "00000000", "00000000" and "00000010" are set as the respective preinformation data PRE1 to PRE4. In the preinformation data PRE1, data "1" at the "2" bit position represents the underline printing, and in the preinformation data PRE2, data "000" at the "0" to "2" bit positions represents US ASCII, and data "00" at the "4" and "5" bit positions represents standard ASCII. The preinformation data PRE4 of "00000010" represents the length of two characters. When printing the two standard ASCII characters "j" and "t" of double height and with underline, data "0010100", "00000000", "00000100" and "00000010" are set as the respective preinformation data PRE1 to PRE4. In this case, the data "1" at the "2" and "4" bit positions of the preinformation data PRE1 represent the underline printing and double height printing, respectively, and data "1" at the "2" bit position of the preinformation data PRE3 represents the double height printing. In either case, the edited data ends with the four end mark data EM.

When the editing of data as described is completed, the printing condition is met, so that the printing routine is executed.

The printing routine will now be described in detail with reference to FIG. 10. First, the print work registers PW0 to PW31 are cleared. Then, the CPU 1 reads out data PL, DL, SPL and PS and transfers these data to the CPU 2. The CPU 1 then sets the PS flag, and then it sends dummy data and printing data to the latch circuit 9. The CPU 2 thus starts the printing operation. The CPU 1 takes out printing data from the host computer 14 and transfers it to the CPU 2 until it is detected in STEP10 that a print end (PE) flag is set. When the CPU 1 receives an interrupt signal INT1 or INT2 while it is transferring printing data to the CPU 2, it executes an interruption routine, shown in FIGS. 11A, 11B and 12, in response to the rising of the interrupt signal. The printing operation is ended when the PE flag is set in the interruption routine shown in FIG. 12.

After the end of the printing operation, the CPU 1 checks in STEP11 whether the printing operation was the double height character printing. If it is detected that the operation was the double height character printing, a check is made in STEP12 to see if an upper-/lower (U/L) flag is set. If the U/L flag is set, the CPU 1 resets the flag, while it sets the flag if it is detected that the flag is reset.

Figure 10:
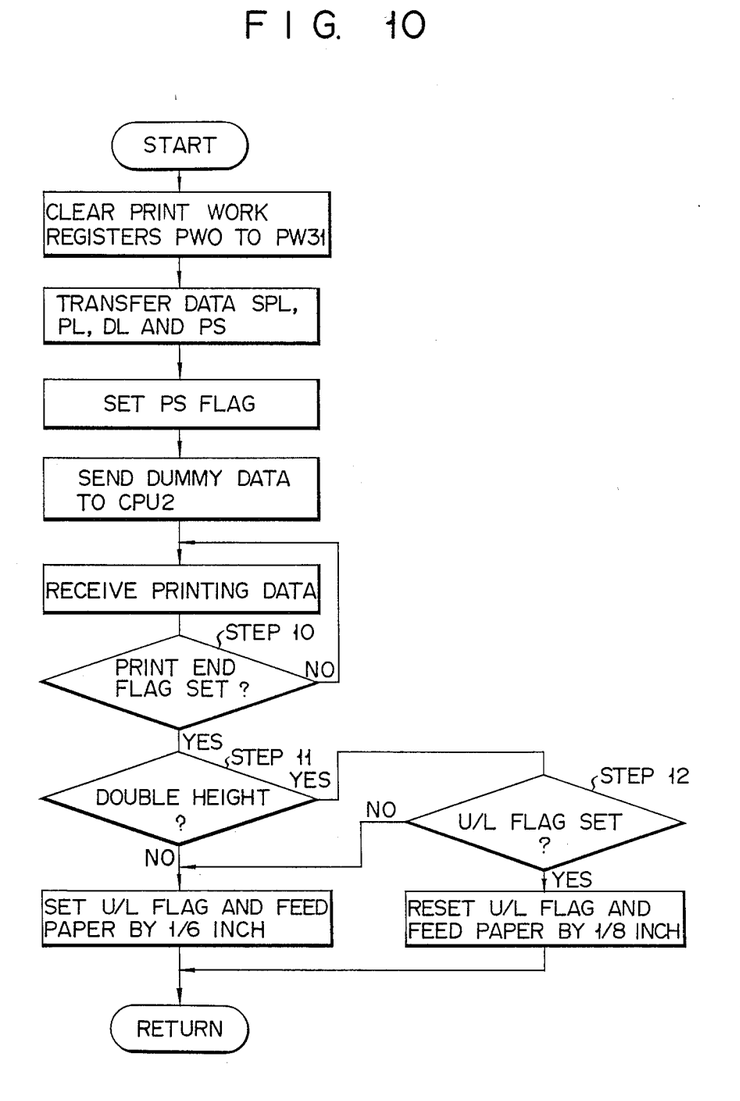
FIG. 10 is a flow chart showing a printing routine.
Figure 11A:
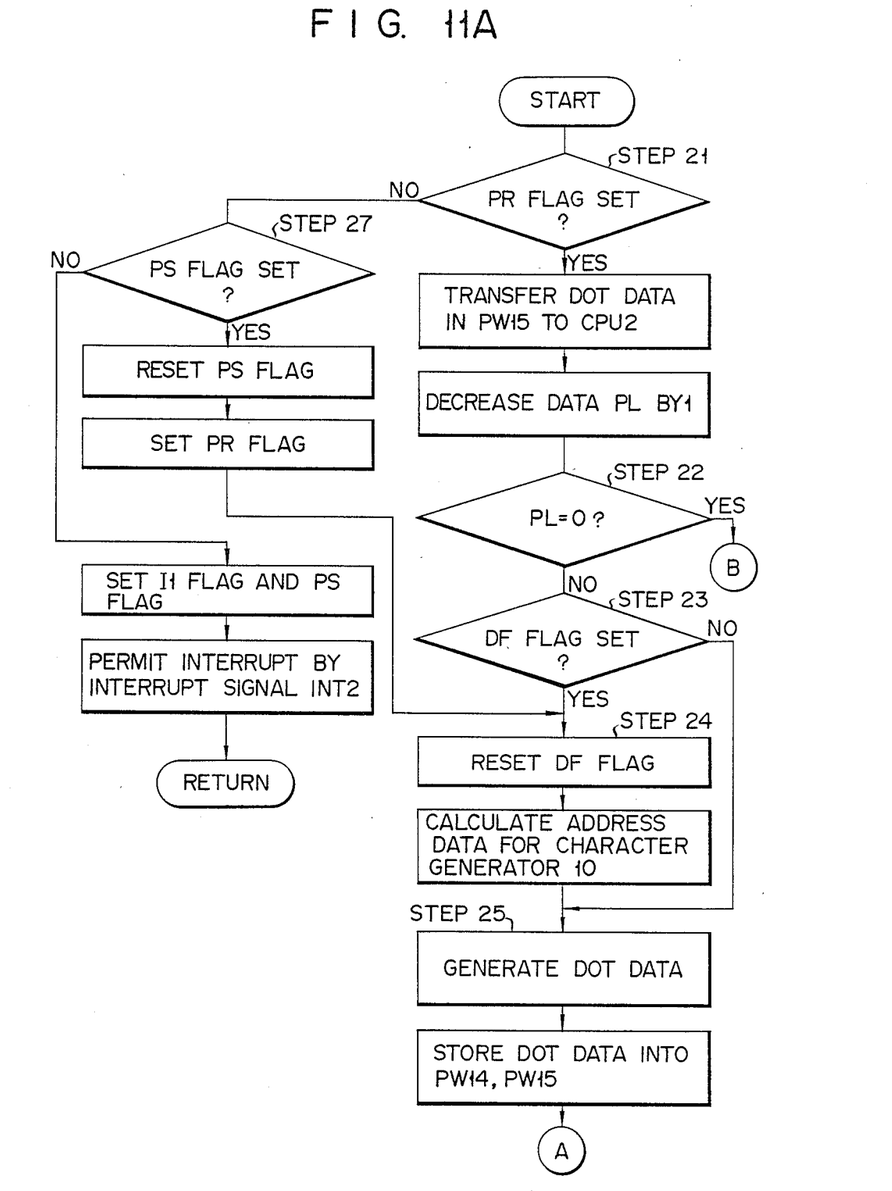
FIGS. 11A and 11B are flow charts showing an interrupt routine of the master CPU.
Figure 11B:
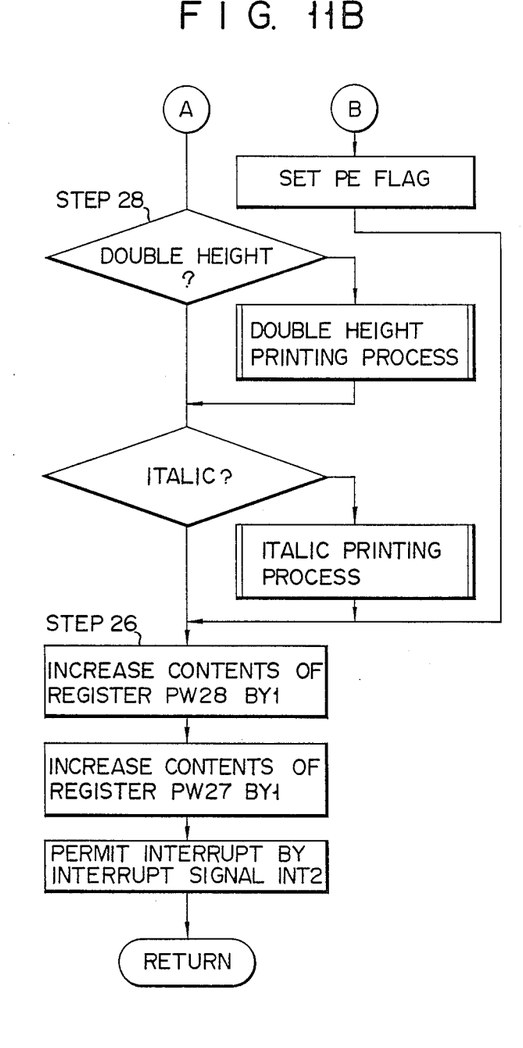

The CPU 1 executes the interruption routine as shown in FIGS. 11A and 11B in response to an interrupt signal INT1 which is generated from the CPU 2 receiving the dummy data in the printing routine shown in FIG. 10.

First, CPU 1 executes STEP21 to check whether a print (PR) flag is set. If it is detected that the PR flag is set, the CPU 1 transfers the dot data in the print work register PW15 to the CPU 2, and then it decreases the print length data PL by 1. Then it executes STEP22 to check whether the data PL is 0 or not. If the data PL is not 0, the CPU 1 executes STEP23 to check whether a data fetch (DF) flag is set in the print work register PW21. If it is detected that the DF flag is set, the CPU 1 resets the DF flag. Then it calculates address data for reading out dot data from the character generator 10 according to the edited data stored in the print buffer register. Subsequently, the dot data for one line read out from the character generator 10 is stored in the print work registers PW14 and PW15. Then, it is checked whether printing is to be done by double height character printing, and it is also checked whether the printing is to be done in the italic form. The double height printing process and italic printing process are executed depending on the results of the checks. In a subsequent STEP26, the content of the print work register PW28 representing a column position is increased by 1, and then the content of the print work register PW27 representing the length of underline is increased by 1. Then, the CPU permits interruption by the interrupt signal INT2 from the CPU 2.

If it is detected in STEP23 of the next printing cycle that the DF flag is not set, STEP25 is immediately executed without calculation of the address data for the character generator 10. If it is detected in STEP22 that the data PL is 0, the CPU 1 sets the PE flag, and then executes STEP26. If it is detected in STEP21 that the PR flag is not set, the CPU 1 executes STEP27 to check whether the PS flag is set. If it is detected that the PS flag is not set, the CPU 1 sets the I1 flag, and then permits interruption by the interrupt signal INT2 from the CPU 2. If it is detected in STEP27 that the PS flag is set, the CPU 1 resets the PS flag, then sets the PR flag, and then executes STEP24.

Figure 8:
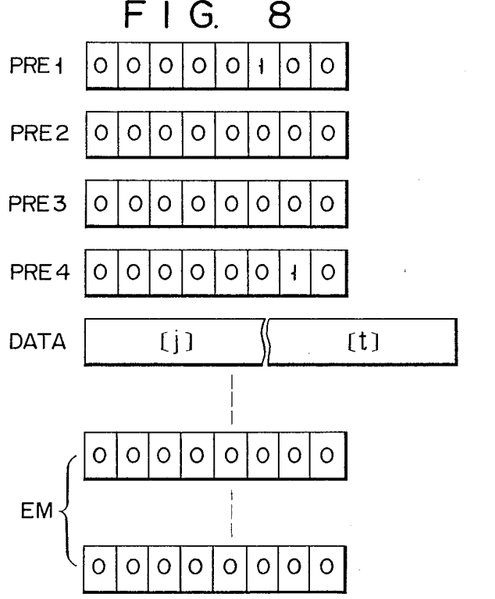
FIGS. 8 and 9 are views showing edited data for printing ordinary size data with an underline and for printing double height characters with an underline.
Figure 9:
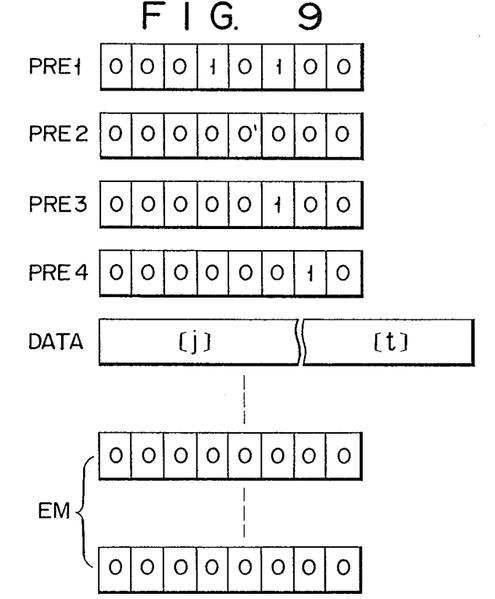
Figure 13A:
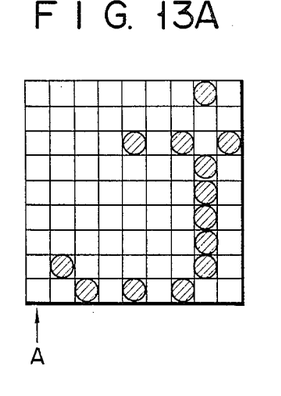
FIGS. 13A and 13B are views showing dot data of character data "j" and "t"
Figure 13B:
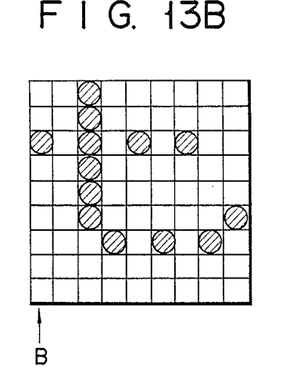

The DF flag is set for every character change. For example, when the characters "j" and "t" shown in FIG. 8 or 9 are to be generated from the character generator 10, the first addresses of the characters "j" and "t" are stored in the print work registers PW8 and PW9 according to the edited data stored in the print buffer area. This means that address data for designating the dot data in the columns shown by arrows A and B in FIGS. 13A and 13B are stored in the print work registers PW8 and PW9. Then, the number of interruptions by the interrupt signal INT1 is stored in the print work register PW28 which serves as a column counter.

Thus, in order to generate the next dot data from the character generator 10, the sum data (IA+CA) of the inherent address data IA stored in the print work registers PW8 and PW9 and column address data CA stored in the print work register PW28 is transferred as address data to the character generator 10. The dot data thus generated from the character generator 10 is stored in the print work register PW15.

Now, the operation will be described in connection with a case where the characters "j" and "t" are printed continuously with the head 22 moved at a speed of, for instance, 10 cpi according to the edited data as shown in FIG. 8.

Figure 12:
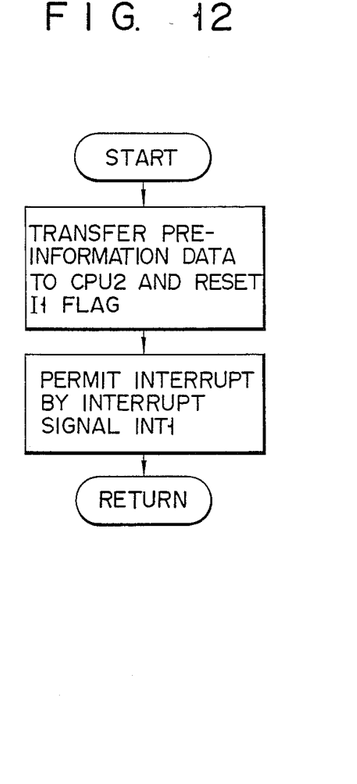
FIG. 12 is a flow chart showing a different interrupt routine of the master CPU.
Figure 14:
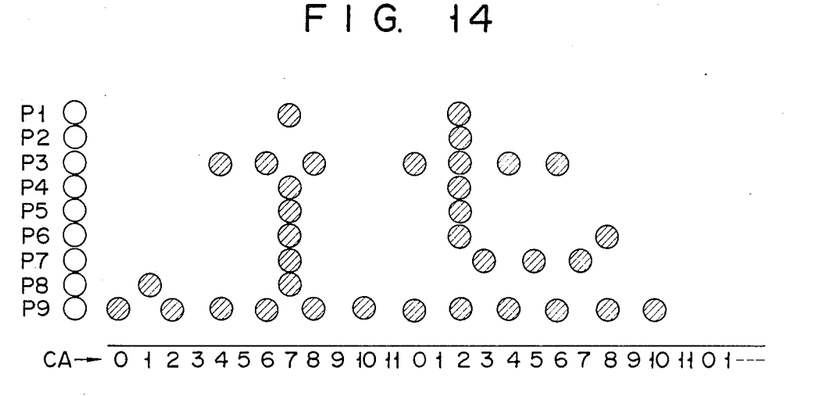
FIG. 14 is a view showing an example of print when ordinary size character data "j" and "t" are printed together with an underline.

When the CPU 1 generates dummy data from the CPU 1 in the flow chart shown in FIG. 10, an interrupt signal INT1 is transferred from the CPU 2 to the CPU 1, whereby the routine shown in FIGS. 11A and 11B is executed. In this case, both the PR flag and PS flag have been reset, so that the CPU 1 sets the I1 flag and then permits interruption by the interrupt signal INT2 from the CPU 2. In response to the interrupt signal INT2, the CPU 1 transfers the preinformation data stored in the print work register PW14 to the CPU 2 and resets the I1 flag, and then it permits interruption by the interrupt signal INT1 from the CPU 2, as shown in FIG. 12. When the interrupt signal INT1 is subsequently generated from the CPU 2, the CPU 1 executes the routine shown in FIGS. 11A and 11B in response to this interrupt signal INT1. Since in this case the PS flag has been set, the CPU 1 sets the PR flag, then resets the DF flag, and then it calculates the first address data of the character data "j" according to the preinformation data PRE1 to PRE4 shown in FIG. 7 and character data "j" as described before. Corresponding 8-bit data is thus generated from the character generator 10 and stored in the print work register PW15. If the CPU 1 detects in this case that the DH flag is reset, that the UL flag is set and that the underline count data stored in the print work register PW27 represents an even number, it sets data "1" at the "3" bit position of the print work register PW14. Then, the CPU 1 increases the contents of the print work registers PW28 and PW27 by 1, and permits interruption by the interrupt signal INT2 from the CPU 2. Then, the CPU 1, in response to the interrupt signal INT2 from the CPU 2, transfers the preinformation data stored in the print work registers PW14 to the CPU 2 and then permits interruption by the interrupt signal INT1 from the CPU 2, as shown in FIG. 12. In response to the interrupt signal INT1 from the CPU 2, the CPU 1 executes the routine shown in FIGS. 11A and 11B. Since in this case the PR flag is set, the CPU 1 transfers the dot data stored in the print work register PW15, and decreases the data PL by 1. Also, since in this case the DF flag is reset, in STEP26 dot data of the column "1" of the character data "j" is generated from the character generator 10 with the sum data (IAj+CA) of the inherent address data IAj corresponding to the character "j" stored in the print work registers PW8 and PW9 and the address data CA stored in the print work register PW28 as address data, and it is stored in the print work registers PW14 and PW15. Then, the contents of the print work registers PW28 and PW29 are increased by 1. A similar operation is subsequently executed, and when the column address data CA in the print work register PW28 is "11", i.e., when the last address of the character data "j" is designated, dot data is generated from the character generator 10 in STEP25 in FIG. 11A. The CPU 1 then clears the print work register PW28 and sets DF flag. Therefore, when the routine shown in FIG. 11A is executed with subsequent generation of an interrupt signal INT1, the CPU 1 resets the DF flag, and calculates the first address of the character data "t" according to the preinformation data PRE1 to PRE4 and character data "t", thus generating corresponding dot data in the character generator 10 and storing the dot data in the print work registers PW14 and PW15. Subsequently, the CPU 1 increases the print length data PL by 1 and increases the contents of the print work registers PW28 and PW27 by 1 in each printing cycle in the manner as described above. When the content of the print work register PW28 thus becomes "11", continuously printed characters "j" and "t" as shown in FIG. 14 are obtained together with an underline printed by the pin P9. If it is detected that the print length data PL is "0", the CPU 1 sets the PE flag. Thus, it is detected in STEP12 in FIG. 10 that the PE flag is set, thus stopping the printing routine.

Now, the operation will be described in connection with a case when printing characters "j" and "t" of double height and with underline according to the edited data shown in FIG. 9. In this embodiment, the head has nine printing pins P1 to P9 arranged in a row at a pitch of 1/72 inch. In the double height printing, the upper half of the characters in one line is printed using the nine printing pins in a first printing operation. Then the paper is fed by ⅛ inch, and then the lower half of the characters of the same line is printed in a second printing operation. In this case, the dot data of the characters "j" and "t" of the same line, which is generated from the character generator 10, is the same as the data generated when printing the ordinary characters "j" and "t".

Figure 15:
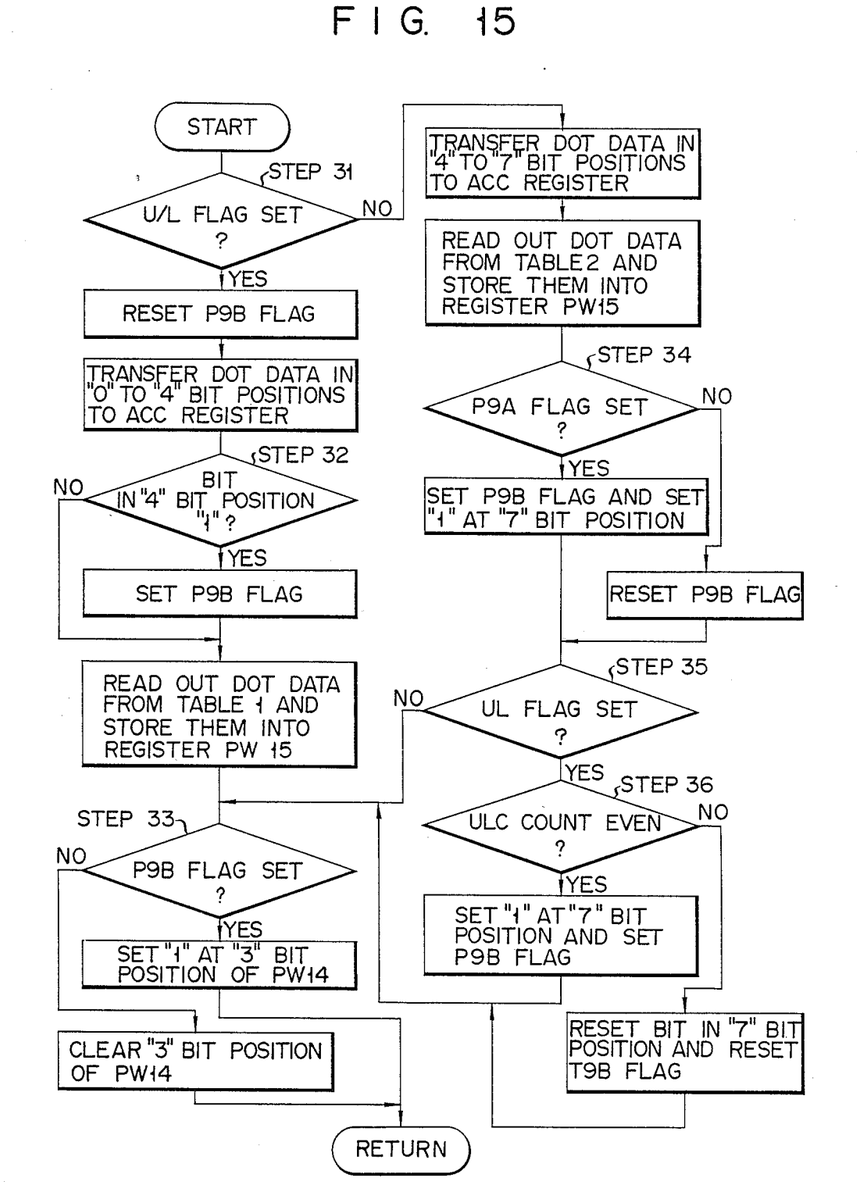
FIG. 15 is a flow chart a double height printing routine.

In the case of the double height character printing, like the ordinary character printing, the dummy data is generated from the CPU 11, and 9-bit dot data designated by the first column address of the character data "j" is stored in the print work registers PW14 and PW15 in the routine shown in FIGS. 11A and 11B. Subsequently, when the double height printing is detected in STEP28, the CPU 1 executes a double height printing routine as shown in FIG. 15. In STEP31 of this routine, the CPU 1 checks whether the U/L flag is set. If it is detected that the U/L flag is set, the CPU 1 resets the P9B flag and then transfers dot data in the "0" to "4" bit positions of the print work register PW15 to an accumulator (ACC) register. In STEP32, the CPU 1 checks whether the "4" bit position bit in the print work register PW15 is "1". If this bit is "1", the CPU 1 sets the P9B flag, and then dot data is read out from a TABLE 1 shown below, which is stored in the ROM 3, according to the "0" to "3" bit position data in the ACC register. If the "4" bit position bit is "0", the dot data is read out immediately, i.e., without setting the P9B flag.

TABLE 1

| ACC Register | | | | Output Dot Data | | | | | | | |
|---|---|---|---|---|---|---|---|---|---|---|---|
| "3" | "2" | "1" | "0" | "7" | "6" | "5" | "4" | "3" | "2" | "1" | "0" |
| 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 1 | 1 |
| 0 | 0 | 1 | 0 | 0 | 0 | 0 | 0 | 1 | 1 | 0 | 0 |

TABLE 1-continued

| ACC Register | | | | Output Dot Data | | | | | | | |
|---|---|---|---|---|---|---|---|---|---|---|---|
| "3" | "2" | "1" | "0" | "7" | "6" | "5" | "4" | "3" | "2" | "1" | "0" |
| 0 | 0 | 1 | 1 | 0 | 0 | 0 | 0 | 1 | 1 | 1 | 1 |
| 0 | 1 | 0 | 0 | 0 | 0 | 1 | 1 | 0 | 0 | 0 | 0 |
| 0 | 1 | 0 | 1 | 0 | 0 | 1 | 1 | 0 | 0 | 1 | 1 |
| 0 | 1 | 1 | 0 | 0 | 0 | 1 | 1 | 1 | 1 | 0 | 0 |
| 0 | 1 | 1 | 1 | 0 | 0 | 1 | 1 | 1 | 1 | 1 | 1 |
| 1 | 0 | 0 | 0 | 1 | 1 | 0 | 0 | 0 | 0 | 0 | 0 |
| 1 | 0 | 0 | 1 | 1 | 1 | 0 | 0 | 0 | 0 | 1 | 1 |
| 1 | 0 | 1 | 0 | 1 | 1 | 0 | 0 | 1 | 1 | 0 | 0 |
| 1 | 0 | 1 | 1 | 1 | 1 | 0 | 0 | 1 | 1 | 1 | 1 |
| 1 | 1 | 0 | 0 | 1 | 1 | 1 | 1 | 0 | 0 | 0 | 0 |
| 1 | 1 | 0 | 1 | 1 | 1 | 1 | 1 | 0 | 0 | 1 | 1 |
| 1 | 1 | 1 | 0 | 1 | 1 | 1 | 1 | 1 | 1 | 0 | 0 |
| 1 | 1 | 1 | 1 | 1 | 1 | 1 | 1 | 1 | 1 | 1 | 1 |

The output dot data of 8 bits can be obtained by expanding each bit of 4-bit dot data stored in the ACC register to two bits.

Subsequently, the CPU 1 executes STEP33 to check whether the P9B flag is set. If the flag is set, the CPU 1 sets data "1" in the "3" bit position of the print work register. If not, it sets data "0".

Figure 16A:
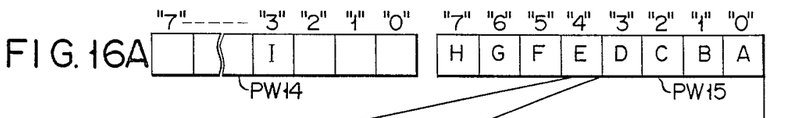
FIGS. 16A to 16D are views for explaining data conversion for double height printing.
Figure 16B:
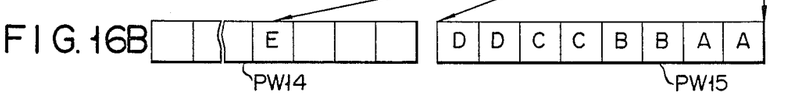

In the manner described above, the dot data written from the print buffer area into the print work registers PW14 and PW15, as shown in FIG. 16A, is replaced with corresponding dot data read out from the TABLE 1, as shown in FIG. 16B. The dot data shown in FIG. 16B, stored in the print work registers PW14 and PW15, is transferred to the CPU2 for printing. Subsequently, nine-bit dot data designated by the second column address of the character data "j" is stored in the print work registers PW14 and PW15 in the manner as described above and then converted into the corresponding dot data according to the TABLE 1 in the manner as described above.

Figure 17:
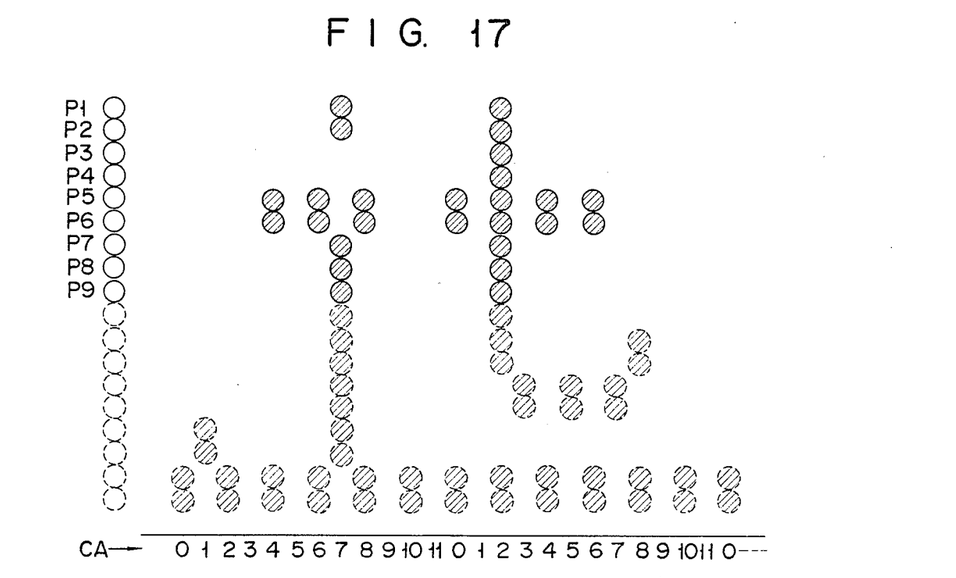
FIG. 17 is an example of print of character data "j" and "t" obtained in the double height printing routine.

Successive dot data are read out continuously in the manner as described above, and when dot data designated by the last column address of the character data "j" is processed, then dot data designated by the first column address data of the character data "t" is processed. When dot data designated by the last column address of the character data "t" is processed, the upper half of the characters "j" and "t", as shown by solid circles in FIG. 17, is printed. When the upper half of the characters of one line is printed, it is detected in STEP22 in FIG. 11A that the print length data PL is 0, and the CPU 1 sets the PE flag. It is thus detected in STEP12 in FIG. 10 that the PE flag is set. The CPU 1 thus executes STEP13 and STEP14, then resets the U/L flag, and then transfers feed data to the CPU 2 for feeding paper by ⅛ inch. Subsequently, the CPU 1 transfers drive data to the CPU 2 to cause rotation of the carriage motor 26 so as to set the head 25 to the home position.

Figure 16C:
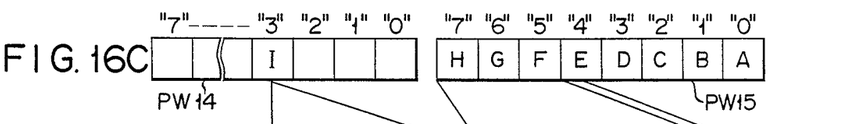

Subsequently, the CPU 1 detects that the U/L flag is reset and starts the operation of printing the character data "j" and "t" without changing the data shown in FIG. 9. Dot data designated by the first address data of the character data "j" is thus stored in the print work registers PW14 and PW15 as shown in FIG. 16C in the manner as described above. In this case, in the routine of FIG. 15 executed by the CPU 1, it is checked in STEP31 that the U/L flag is reset. If it is detected that the flag is reset, 4-bit data in the "4" to "7" bit positions of the print work register PW15 is transferred to the ACC register in the CPU 1. According to this 4 bit data, the CPU 1 reads out corresponding 8-bit data from TABLE 2 shown below stored in the ROM 3.

TABLE 2

| ACC Register | | | | Output Dot Data | | | | | | | |
|---|---|---|---|---|---|---|---|---|---|---|---|
| "7" | "6" | "5" | "4" | "7" | "6" | "5" | "4" | "3" | "2" | "1" | "0" |
| 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 1 |
| 0 | 0 | 1 | 0 | 0 | 0 | 0 | 0 | 0 | 1 | 1 | 0 |
| 0 | 0 | 1 | 1 | 0 | 0 | 0 | 0 | 0 | 1 | 1 | 1 |
| 0 | 1 | 0 | 0 | 0 | 0 | 0 | 1 | 1 | 0 | 0 | 0 |
| 0 | 1 | 0 | 1 | 0 | 0 | 0 | 1 | 1 | 0 | 0 | 1 |
| 0 | 1 | 1 | 0 | 0 | 0 | 0 | 1 | 1 | 1 | 1 | 0 |
| 0 | 1 | 1 | 1 | 0 | 0 | 0 | 1 | 1 | 1 | 1 | 1 |
| 1 | 0 | 0 | 0 | 0 | 1 | 1 | 0 | 0 | 0 | 0 | 0 |
| 1 | 0 | 0 | 1 | 0 | 1 | 1 | 0 | 0 | 0 | 0 | 1 |
| 1 | 0 | 1 | 0 | 0 | 1 | 1 | 0 | 0 | 1 | 1 | 0 |
| 1 | 0 | 1 | 1 | 0 | 1 | 1 | 0 | 0 | 1 | 1 | 1 |
| 1 | 1 | 0 | 0 | 0 | 1 | 1 | 1 | 1 | 0 | 0 | 0 |
| 1 | 1 | 0 | 1 | 0 | 1 | 1 | 1 | 1 | 0 | 0 | 1 |
| 1 | 1 | 1 | 0 | 0 | 1 | 1 | 1 | 1 | 1 | 1 | 0 |
| 1 | 1 | 1 | 1 | 0 | 1 | 1 | 1 | 1 | 1 | 1 | 1 |

The output dot data of 8 bits can be obtained by expanding each bit of the 4-bit dot data in the ACC register to two bits and shifting the result by one bit in a lower digit direction.

Subsequently, in STEP34, the CPU 1 checks whether the P9A flag is set in the print work register PW19. If it is set, the CPU 1 sets the P9B flag in the print work register PW20, and then stores data "1" in the "7" bit position in the print work register PW15. If the flag is not set, the CPU 1 resets the P9B flag and then stores data "0" in the "7" bit position of the print work register PW15. In STEP35 the CPU 1 checks whether the U/L flag is set. If it is detected that the flag is reset, the CPU 1 executes STEP33. If it is detected that the U/L flag is set, the CPU 1 executes STEP36 to check whether count data representing the underline length stored in the print work register PW27 is even. If it is detected that the count data is even, the CPU 1 sets the P9B flag, and then sets data "1" in the "7" bit position of the print work register PW15. If the count data is odd, the CPU 1 resets the P9B flag and sets data "0" in the "7" bit position of the print work register PW15.

Figure 16D:
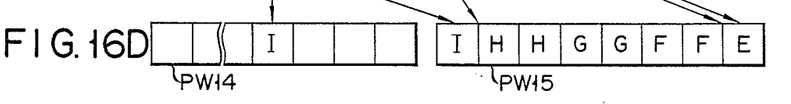

In the above manner, the dot data in the "4" to "6" bit positions of the print work register PW15 as shown in FIG. 16C are respectively transferred to the "0" bit position, "1" and "2" bit positions, "3" and "4" bit positions and "5" and "6" bit positions as shown in FIG. 16D, and also the dot data n the "3" bit position of the print work register PW14 is set in the "7" bit position of the print work register PW15 and the "3" bit position of the print work register PW14.

When a special flag representing the printing of the character "j" is set in the print work register PW17, the P9A flag is set only when the column address CA is "2", "4" or "6" and is otherwise reset.

As has been shown, if it is detected in STEP35 that the U/L flag is set, data "1" is set in the "7" bit position of the print work register PW14 and the "3" bit position of the print work register PW15 when the count address CA is even. Thus, the underline is printed simultaneously with the lower half of the characters "j" and "t". Thus, the characters "j" and "t" are completed and the underline is printed by the pins P8 and P9 as shown in FIG. 17.

In the above embodiment, the pin P9 is used when printing an underline with ordinary size characters while the pins P8 and P9 are used to print a bold underline together with double height size characters. It is thus possible to print underlines that are in balance with simultaneously printed characters.

While one embodiment of the invention has been described, it is by no means limitative. For example, it is possible to use a single CPU of a large capacity and at a high speed in lieu of the CPUs 1 and 2 and latch circuit 9 shown in the data processing circuit shown in FIG. 1.

While in the above embodiment the pin P9 is used for printing an underline with ordinary size characters while the pins P9 and P8 are used to print an underline with double height size characters, where the head 25 is formed of 17 head pins it is possible to use two pins for printing an underline with ordinary size characters and 3, 4 or 5 pins for printing an underline with double height characters.

Further, in place of the head pins P1 to P9, it is possible to use thermal head pins or ink jet elements.

What is claimed is:

1. A dot printing device comprising:
a head having N dot printing elements arranged in a row;
head driving means for selectively energizing said dot printing elements according to dot data;
head moving means for causing movement of said head relative to paper perpendicularly to said row;
paper feeding means for feeding paper parallel to said row;
character generating means;
memory means for storing character designation data and underline data in respective assigned memory locations; and
data processing means for reading out to said memory in a normal printing mode, according to first input data including character designation data and underline data, character data designated by said character designation data in said first input data and constituted by a plurality of N-bit dot data from said character generating means and transferring said plurality of N-bit dot data corresponding to said character data and underline data from said memory means to said head driving means for printing said character data and also printing an underline with a first predetermined number of dot printing elements among said N dot printing elements, and also for reading out to said memory means in a double height printing mode, according to second input data including character designation data, underline data and double height data, character data designated by said character designation data in said second input data and constituted by a plurality of N-bit dot data from said character generating means, transferring N-bit dot data equal to N-bit dot data which is included in 2N-bit dot data obtained by expanding selected bits in each of said plurality of N-bit dot data and which correspond to an upper half portion of said character data from said memory means to said head driving means for printing said upper half portion of said character data, then reading out to said memory means character data designated by said character designation data in said second input data and constituted by a plurality of N-bit dot data from said character generating means and transferring N-bit dot data equal to N-bit dot data which is included in 2N-bit dot data obtained by expanding selected bits of each of said plurality of N-bit dot data and which correspond to a lower half portion of said character data and dot data representing an underline from said memory means to said head driving means;
wherein said data processing means controls said head driving means so that said lower half of said character data is printed in a position matched to said upper half portion of character data printed in the preceding printing cycle while also printing an underline with a second predetermined number of lower dot printing elements greater in number than said first predetermined number among said N dot printing elements.

2. A dot printing device according to claim 1, wherein said memory means includes:
first memory means including N-bit register means;
second memory means including first and second conversion tables; and
wherein said data processing means includes a data processing unit for storing N-bit dot data generated from said character generating means in said N-bit register means according to said second input data, converting said N-bit dot data stored in said N-bit register means into N-bit dot data representing an upper half of the designated character data according to said first conversion table and transferring said N-bit dot data to said head driving means in a first printing cycle and also storing N-bit dot data generated from said character generating means in said N-bit register means according to said second input data, converting said N-bit dot data stored in said N-bit register means into N-bit dot data representing a lower half of said designated character data and transferring said converted N-bit dot data together with dot data of said second predetermined number of bits representing an underline to said head driving means.

3. A dot printing device according to claim 2, wherein said first memory means further includes a flag memory area for storing a first flag representing double height printing and a second flag representing said first or second printing cycle, and said data processing unit executes said first printing cycle when it is detected that said first flag is set, resets said second flag when said first printing cycle is completed and executes said second printing cycle when it is detected that said first flag is set and said second flag is reset.

4. A dot printing device according to claim 1, wherein said head driving means has an N-bit register for receiving N-bit dot data from said data processing means, said head driving means energizing said N dot printing elements according to N-bit dot data stored in said N-bit register.

5. A dot printing device comprising:
a head having N dot printing elements arranged in a row;
head driving means for selectively energizing said dot printing elements according to dot data;
head moving means for causing movement of said head relative to paper perpendicularly to said row;
paper feeding means for feeding paper parallel to said row;
character generating means;
memory means for storing character designation data and underline data in respective assigned memory locations; and
data processing means for reading out to said memory in a normal printing mode, according to first input data including character designation data and underline data, character data designated by said character designation data in said first input data and constituted by a plurality of N-bit dot data from said character generating means and transferring said plurality of N-bit dot data corresponding to said character data and underline data from said memory means to said head driving means for printing said character data and also printing an underline with a first predetermined number of dot printing elements among said N dot printing elements, and also for reading out to said memory means in a double height printing mode, according to second input data including character designation data, underline data and double height data, character data designated by said character designation data in said second input data and constituted by a plurality of N-bit dot data from said character generating means, transferring N-bit dot data equal to N-bit dot data which is included in 2N-bit dot data obtained by expanding selected bits in each of said plurality of N-bit dot data and which correspond to an upper half portion of said character data from said memory means to said head driving means for printing said upper half portion of said character data, then reading out to said memory means character data designated by said character designation data in said second input data and constituted by a plurality of N-bit dot data from said character generating means and transferring N-bit dot data equal to N-bit dot data which is included in 2N-bit dot data obtained by expanding selected bits of each of said plurality of N-bit dot data and which correspond to a lower half portion of said character data and dot data representing an underline from said memory means to said head driving means;
said data processing means including means for generating the N-bit dot data which corresponds to the upper half portion of said character data by replacing underline data at its assigned memory location with selected character designation data so that the N-bit dot data corresponding to the upper half portion of said character data consists of character designation data, and for generating the N-bit dot data which corresponds to a lower half portion of said character data and dot data representing an underline by retaining the underline data in its assigned memory location and replacing character designation data with underline data at a selected memory location;
whereby said lower half of said character data is printed in a position matched to said upper half portion of character data printed in the preceding printing cycle while also printing an underline with a second predetermined number of lower dot printing elements greater in number than said first predetermined number among said N dot printing elements.

6. A dot printing device according to claim 5, wherein said memory means includes:
first memory means including N-bit register means;
second memory means including first and second conversion tables; and
wherein said data processing means includes a data processing unit for storing N-bit dot data generated from said character generating means in said N-bit register means according to said second input data, converting said N-bit dot data stored in said N-bit register means into N-bit dot data representing an upper half of the designated character data according to said first conversion table and transferring said N-bit dot data to said head driving means in a first printing cycle and also storing N-bit dot data generated from said character generating means in said N-bit register means according to said second input data, converting said N-bit dot data stored in said N-bit register means into N-bit dot data representing a lower half of said designated character data and transferring said converted N-bit dot data together with dot data of said second predetermined number of bits representing an underline to said head driving means.

7. A dot printing device according to claim 6, wherein said first memory means further includes a flag memory area for storing a first flag representing double height printing and a second flag representing said first or second printing cycle, and said data processing unit executes said first printing cycle when it is detected that said first flag is set, resets said second flag when said first printing cycle is completed and executes said second printing cycle when it is detected that said first flag is set and said second flag is reset.

8. A dot printing device according to claim 7, wherein said head driving means has an N-bit register for receiving N-bit dot data from said data processing means, said head driving means energizing said N dot printing elements according to N-bit dot data stored in said N-bit register.

* * * * *

UNITED STATES PATENT AND TRADEMARK OFFICE
CERTIFICATE OF CORRECTION

PATENT NO. : 4,887,226
DATED : December 12, 1989
INVENTOR(S) : Ryozo OBA

It is certified that error appears in the above-identified patent and that said Letters Patent is hereby corrected as shown below:

In the title page, after "Inventor", insert:

-- Assignee: Tokyo Electric Co., Ltd. --

Signed and Sealed this

Eleventh Day of June, 1991

*Attest:*

HARRY F. MANBECK, JR.

*Attesting Officer*     *Commissioner of Patents and Trademarks*